United States Patent
Davidson et al.

(10) Patent No.: US 7,111,065 B2
(45) Date of Patent: Sep. 19, 2006

(54) METHOD AND APPARATUS FOR MANAGING TUNNELED COMMUNICATIONS IN AN ENTERPRISE NETWORK

(75) Inventors: John M. Davidson, Mountain View, CA (US); Akkamapet P. Sundarraj, Santa Clara, CA (US); James R. Pickering, Livermore, CA (US)

(73) Assignee: Efficient Networks, Inc., Dallas, TX (US)

(*) Notice: Subject to any disclaimer, the term of this patent is extended or adjusted under 35 U.S.C. 154(b) by 854 days.

(21) Appl. No.: 09/727,313

(22) Filed: Nov. 29, 2000

(65) Prior Publication Data

US 2002/0065921 A1    May 30, 2002

(51) Int. Cl.
*G06F 15/16* (2006.01)
(52) U.S. Cl. ..................................... 709/227
(58) Field of Classification Search ................. 709/228, 709/230, 232, 237, 245, 246; 370/389, 395, 370/466, 474
See application file for complete search history.

(56) References Cited

U.S. PATENT DOCUMENTS

| | | | |
|---|---|---|---|
| 5,884,024 A | 3/1999 | Lim et al. ............... | 395/187.01 |
| 6,061,346 A * | 5/2000 | Nordman ................... | 370/352 |
| 6,101,539 A * | 8/2000 | Kennelly et al. ........... | 709/223 |
| 6,118,785 A * | 9/2000 | Araujo et al. ............... | 370/401 |
| 6,182,141 B1 * | 1/2001 | Blum et al. ................. | 709/227 |
| 6,189,039 B1 * | 2/2001 | Harvey et al. .............. | 709/232 |
| 6,301,229 B1 * | 10/2001 | Araujo et al. ............... | 370/252 |
| 6,449,272 B1 * | 9/2002 | Chuah et al. ............... | 370/389 |
| 6,463,475 B1 * | 10/2002 | Calhoun ...................... | 709/227 |
| 6,522,880 B1 * | 2/2003 | Verma et al. ............... | 455/436 |
| 6,591,306 B1 * | 7/2003 | Redlich ...................... | 709/245 |
| 6,609,153 B1 * | 8/2003 | Salkewicz ................... | 709/223 |
| 6,614,809 B1 * | 9/2003 | Verma et al. ............... | 370/469 |
| 6,633,761 B1 | 10/2003 | Singhal et al. ............... | 455/436 |
| 6,651,093 B1 * | 11/2003 | Wiedeman et al. ......... | 709/221 |
| 6,675,225 B1 * | 1/2004 | Genty et al. ................ | 709/245 |
| 6,697,360 B1 * | 2/2004 | Gai et al. .................... | 370/389 |

* cited by examiner

*Primary Examiner*—Andrew Caldwell
*Assistant Examiner*—Stephan Willett
(74) *Attorney, Agent, or Firm*—Baker Botts L.L.P.

(57) ABSTRACT

In one aspect of the invention a method includes, at a tunneling server, receiving from first client a point-to-point protocol signal encapsulated within a network address request header, the point-to-point protocol signal comprising an identifier identifying a destination client. The method further comprises encapsulating the point-to-point signal within a network address response header and communicating the network address response encapsulated signal toward the destination client.

36 Claims, 6 Drawing Sheets

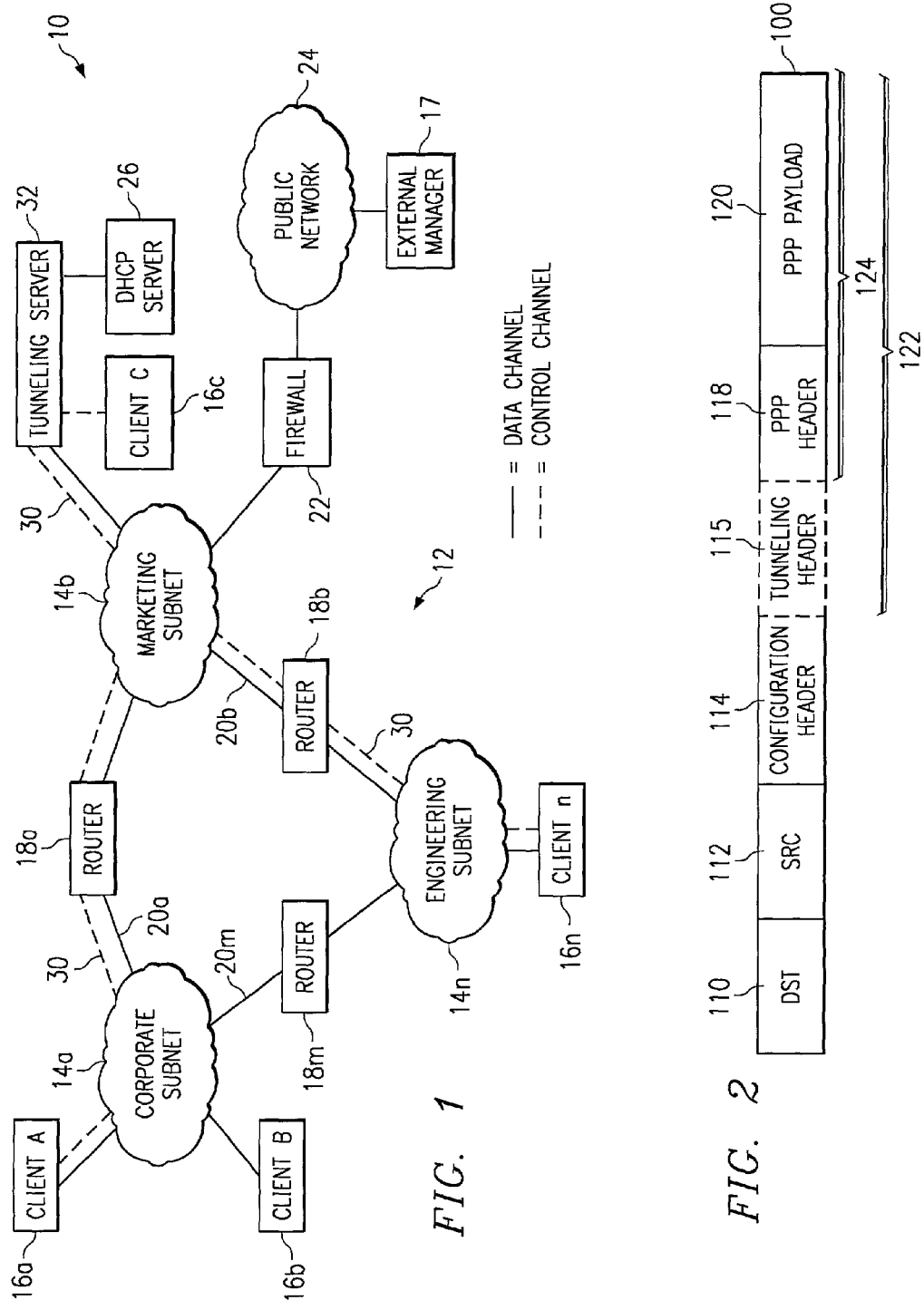

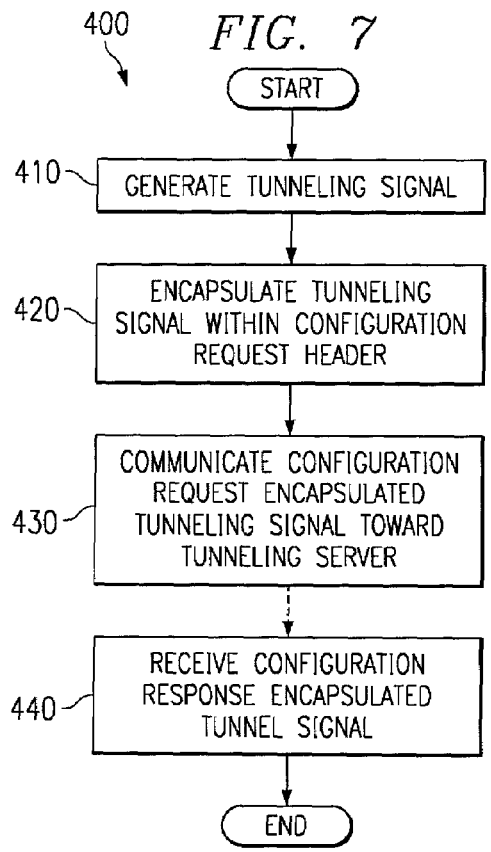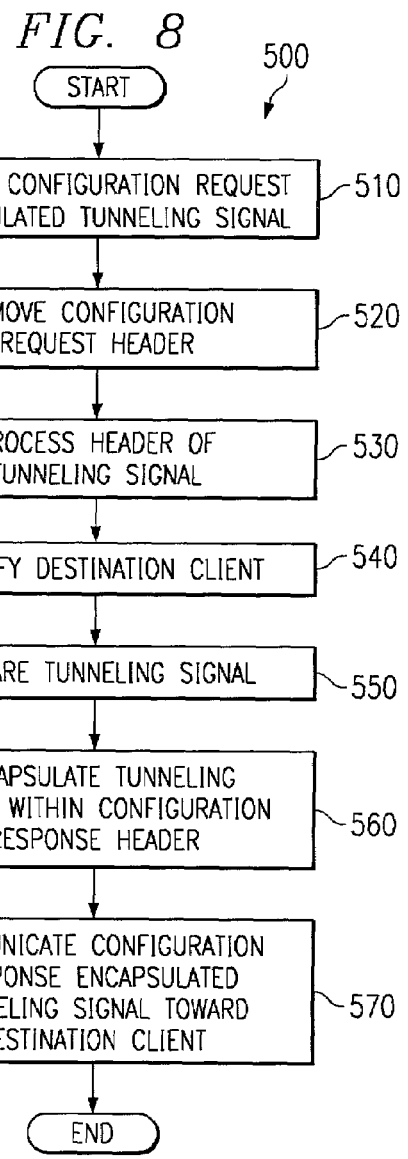

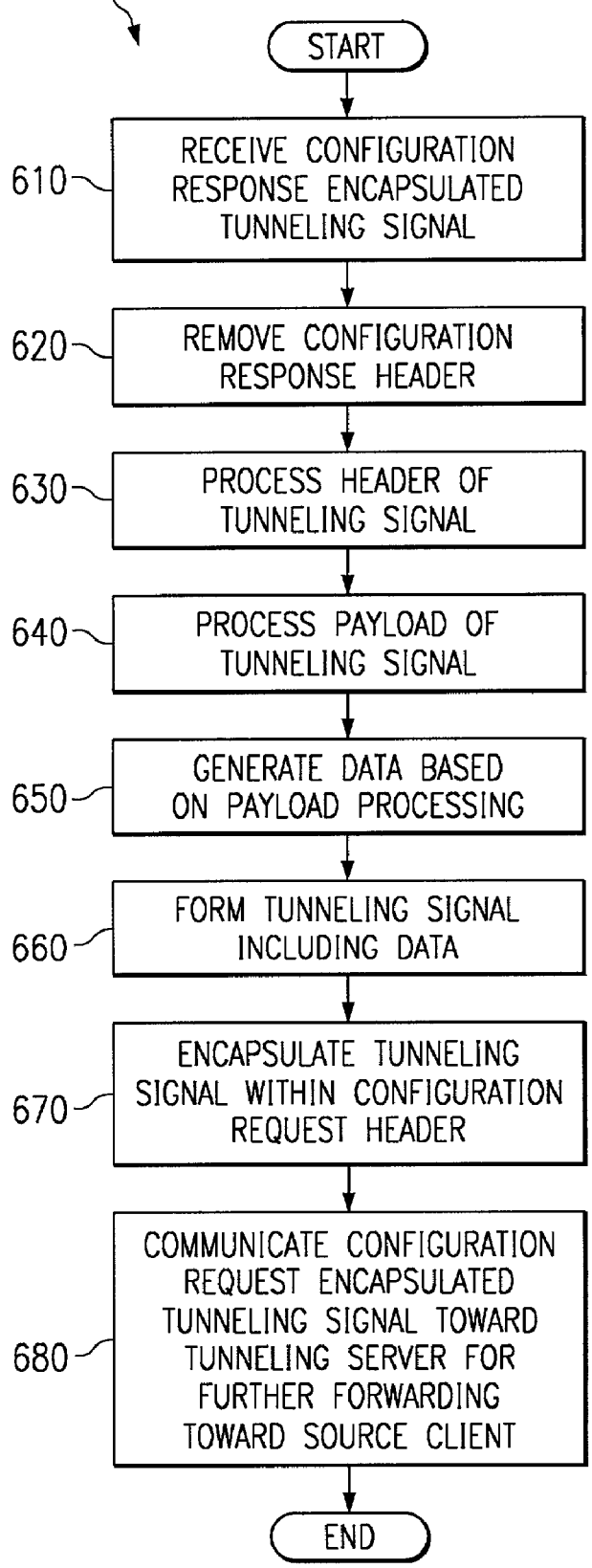

METHOD AND APPARATUS FOR MANAGING TUNNELED COMMUNICATIONS IN AN ENTERPRISE NETWORK

This application is related to pending U.S. application Ser. No. 09/726,766, entitled "Method and Apparatus For Tunneled Communication in an Enterprise Network," which was filed contemporaneously with this application. These applications have been commonly assigned to Efficient Networks, Inc.

TECHNICAL FIELD OF THE INVENTION

The present invention relates to the field of communication system, and more particularly to a system and method operable to facilitate management of tunneled communications in an enterprise network.

BACKGROUND OF THE INVENTION

Various tunneling protocols exist for facilitating secure connections between network elements. For example, the Layer 2 Tunneling Protocol (L2TP), Layer 2 Forwarding (L2F) Protocol, Point-to Point Tunneling Protocol (PPTP) all provide secure connections between network elements implementing those protocols. Used alone, however, these protocols have limitations.

For example, if network firewalls are not specifically configured to accept these tunneling protocols, the tunneling signals will not be permitted beyond the firewall. Configuring a network firewall to accept one or more of these protocol signals can be complex and time consuming. As a result, network firewalls are frequently not configured to accept these protocols. One method of dealing with this limitation is to encapsulate the tunneling signals within a Hypertext Transfer Protocol (HTTP) header to essentially fool the firewall into accepting the entire packet. This technique leverages the fact that most firewalls are configured to accept HTTP headers. By embedding the tunneling signal after an HTTP header, the entire signal can pass any firewall that is configured to accept HTTP traffic.

Another problem with using conventional tunneling protocols without modification, which is not solved by the HTTP encapsulation technique, is that network elements without data channel addresses are ineligible to participate in tunneling. Throughout this document, the term "data channel address" is used to describe a network address that is used to index routing tables accessible to routers coupling various network elements. These addresses may include, for example, Internet Protocol (IP) addresses. Network elements that do not have data channel addresses recognized by the routers are generally unable to communicate point-to-point protocol signals to other network elements using the routers. As a result, conventional tunneling protocol signals generally cannot be communicated by or to network elements that do not have a data channel address. HTTP encapsulation does not address this problem.

SUMMARY OF THE INVENTION

The present invention recognizes a need for a method and apparatus operable to facilitate tunneling in an enterprise network environment. In accordance with the present invention, a system and method for providing enterprise network tunneling are provided that substantially reduce or eliminate at least some of the shortcomings associated with prior approaches.

In one aspect of the invention, a method of communicating in an enterprise network comprises, at a tunneling server, receiving from first client a point-to-point protocol signal encapsulated within a network address request header, the point-to-point protocol signal comprising an identifier identifying a destination client. The method further comprises encapsulating the point-to-point signal within a network address response header and communicating the network address response encapsulated signal toward the destination client.

In another aspect of the invention, a computer readable medium is operable to execute the following steps on a processor of a computer: at a tunneling server, receiving from first client a point-to-point protocol signal encapsulated within a network address request header, the point-to-point protocol signal comprising an identifier identifying a destination client. The method further comprises encapsulating the point-to-point signal within a network address response header and communicating the network address response encapsulated signal toward the destination client.

In still another aspect of the invention, in an enterprise network comprising at least one client coupled to a tunneling server, a tunneling server comprises a tunneling module operable to receive a first point-to-point protocol signal encapsulated within a network address request header, and a protocol stack operable to process at least a portion of the first point-to-point protocol signal to identify a control channel address associated with a destination client. The tunneling module is further operable to encapsulate the first point-to-point protocol signal within a network address response header. The tunneling server is operable to communicate the first network address response encapsulated signal toward the destination client.

In yet another aspect of the invention, A system operable to facilitate communication with a destination client in an enterprise network comprises a first client including a protocol stack operable to generate a first point-to-point protocol signal and a tunneling module operable to encapsulate the first point-to-point encapsulated signal within a network address request header. The first client is operable to communicate the network address request encapsulated signal toward a tunneling server. The system further comprises a tunneling server comprising a tunneling module operable to receive the first network address request encapsulated signal and a protocol stack operable to process at least a portion of the first point-to-point protocol signal to identify a control channel address associated with a destination client. The tunneling module is further operable to encapsulate the first point-to-point protocol signal within a network address response header and the tunneling server is operable to communicate the first network address response encapsulated signal toward the destination client.

Depending on the specific features implemented, particular embodiments of the present invention may exhibit some, none, or all of the following technical advantages. One aspect of the present invention provides a method and apparatus operable to facilitate tunneling, particularly in an enterprise network, with a network element that does not have a data channel address. The invention provides a control channel operable to facilitate relaying of configuration protocol encapsulated tunneling signals between network elements, regardless of whether any of those elements has a data channel address. The tunneling signals encapsulated within the configuration protocol headers comprise point-to-point protocol signals carrying any information useful to be supplied to a tunneling server or another tunneling client.

In a particular embodiment, the tunneling signal encapsulated within the configuration protocol header may comprise a tunneling header appended to the point-to-point protocol signal. The tunneling header may facilitate maintenance of a tunneling session between two network elements using a standard tunneling protocol, such as L2TP, L2F, PPTP, or any other tunneling protocol operable to facilitate a secure connection between network elements. By implementing a tunneling header, this embodiment of the invention can facilitate flow control, authentication, and tunnel identification features available through the various standard tunneling protocols.

The invention finds use in variety of applications. For example, one client can manage, troubleshoot, and/or repair elements within another client over the control channel, even where the data channel serving one or more of those clients becomes disabled. In particular, a managing client can communicate with any other client over the control channel so long as both clients have previously tunneled into a tunneling server. A managing client can tunnel to any other tunneling client by first relaying the configuration protocol encapsulated point-to-point signal to the tunnel server, and then having the tunnel server relay the point-to-point signal to the destination client. In this manner, a managing client could, for example, test network connectivity with a destination client, reload malfunctioning software onto the destination client, load a new application, or perform any other maintenance and/or diagnostic function on that client.

In another aspect of operation, the invention facilitates remote operation of functionality available on one client by another client over the control channel. For example, a first client may communicate commands over the control channel to a second client running a particular application. The second client can receive the command, apply the command to the application to obtain an result, and relay the result back to the first client over the control channel. This feature could apply to any function or process residing on one client, which can be accessed by another client through a control channel.

Other technical advantages are readily apparent to one of skill in the art from the attached figures, description, and claims.

BRIEF DESCRIPTION OF THE DRAWINGS

For a more complete understanding of the present invention, and for further features and advantages thereof, reference is now made to the following description taken in conjunction with the accompanying drawings, in which:

FIG. 1 is a block diagram of an exemplary embodiment of a system operable to facilitate enterprise network tunneling according to the teachings of the present invention;

FIG. 2 is a block diagram showing an exemplary configuration encapsulated tunneling signal constructed according to the teachings of the present invention;

FIG. 7 is a flow chart showing one example of a method of communicating information over a control channel according to the teachings of the present invention;

FIG. 8 is a flowchart showing one example of a method of managing communication between clients on an enterprise network according to the teachings of the present invention; and FIG. 9 is a flow chart showing one example of a method of communicating information in an enterprise network according to the teachings of the present invention.

DETAILED DESCRIPTION OF THE INVENTION

Figure 3:
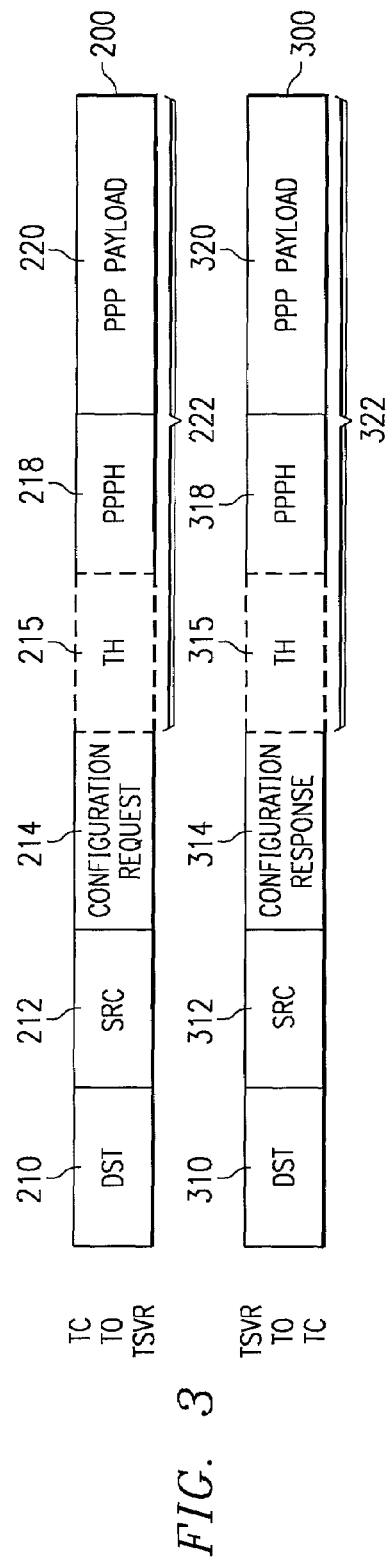
FIG. 3 is a block diagram showing example embodiments of signals communicated between a client and a tunneling server constructed according to the teachings of the present invention.

FIG. 1 is a block diagram of an exemplary embodiment of a system 10 operable to facilitate enterprise network tunneling. System 10 includes an enterprise network 12, which includes a plurality of subnetworks 14a–14n having a plurality of routers 18a–18m coupled between subnetworks 14. Enterprise network 12 may comprise any private network not openly accessible to network elements outside of enterprise network 12. Each subnetwork 14 within enterprise network 12 may comprise any combination of communication links, routers, bridges, switches, or other communication devices operable to facilitate communication between at least a plurality of clients 16 within a common subnetwork 14, and possibly between clients 16 coupled to separate subnetworks 14. Although the illustrated embodiment shows one router 18 between each pair of subnetworks 14, any number of routers 18 and other network equipment could reside between subnetworks 14.

Enterprise network 12 may be coupled to a public network 24 through a firewall 22. Public network 24 may comprise, for example, a data network, a public switched telephone network (PSTN), an integrated services digital network (ISDN), a local area network (LAN), a wide area network (WAN), or other communication systems or combination of communication systems at one or more locations. Network 24 may comprise a wireless network, a wireline network, or a combination of wireless and wireline networks. One or more clients 17 may couple to public network 24.

Each client 16 and 17 may comprise, for example, a workstation, a mainframe computer, a miniframe computer, a desktop computer, a laptop computer, a personal digital assistant, or any other computing or communicating device. In operation, client 16 may execute with any of the well-known MS-DOS, PC-DOS, OS-2, MAC-OS, WINDOWS™, UNIX, or other appropriate operating systems.

Data channels 20a–20m facilitate communication between subnetworks 14 through routers 18. Data channels 20 represent logical communication paths between subnetworks 14 and routers 18. Any communication medium or combination of communication media may support logical data channels 20. For example, data channels 20 may traverse any wireless or wireline communication medium or combination of communication media operable to facilitate ground based and/or spaced based communication between subnetworks 14 and routers 18.

Clients 16a–16b coupled to a common subnetwork 14a may be enabled to communicate with one another through various routers, switches, bridges, and other communication elements within the network architecture of the common subnetwork 14a. In addition, certain of clients 16 may be enabled to communicate with other clients coupled to a different subnetwork 14*n* using data channel 20. For example, clients 16*a* and 16*n* may be associated with data channel addresses used to index routing tables within routers 18. The data channel addresses could, for example, comprise Internet Protocol (IP) addresses. In addition, a client 17 coupled to public network 24 may communicate with client 16*a* over data channel 20 assuming firewall 22 is configured to allow such communication.

In the illustrated embodiment routers 18 include routing tables storing routing information associated with data channel addresses corresponding to various ones of clients 16. Routers 18 may facilitate communication between clients 16*a* and 16*n* (and possibly client 17) over data channel 20 using routing tables referencing data channel addresses associated with those clients. Clients 16*a* and 16*n* may obtain data channel addresses, for example, by registering with a Dynamic Host Configuration Protocol (DHCP) server 26 serving enterprise network 12. Data channel addresses obtained from configuration server 26 may facilitate communication between registered clients 16 over data channels 20, or may allow registered clients 16 to access network elements external to enterprise network 12. While some or all clients 16 may be capable of accessing network elements external to enterprise network 12, enterprise network 12 firewall 22 operates to selectively block certain communications originating outside of enterprise network 12.

Routing tables within routers 18 rely on data channel addresses to index the routing tables and determine signal routing over data channel 20. To accommodate communication from a client 16 that does not have a data channel address recognized by routers 18 to other network elements, the illustrated embodiment of system 10 facilitates indirect communication between clients 16 through a tunneling server 32 using a control channel 30. Control channel 30 comprises a logical communication path between tunneling server 32 and any client 16 tunneling into tunneling server 32. Control channel 30 may, and in many cases does use the same physical medium as data channel 20.

System 10 leverages the fact that routers 18 between clients 16 and tunneling server 32 typically support relaying signals having configuration headers between clients 16 and configuration servers. Configuration protocol headers may comprise any configuration protocols operable to support communication of network address request messages that can be relayed to a configuration server and response messages that can be returned to a particular client. For example, the Dynamic Host Configuration Protocol (DHCP) supports DHCP DISCOVER messages and responsive DHCP OFFER messages. In addition, the Bootstrap Protocol (Boot-P) supports address request messages and returning address response messages. Any configuration protocol supporting these features could be used without departing from the scope of the invention.

By configuring tunneling server 32 to be recognized as a configuration server, clients 16 can communicate with tunneling server 32 by encapsulating Point-to-Point Protocol (PPP) signals within a network address request header and having routers 18 relay the network address request to configuration servers—including tunneling server 32. Tunneling server 32 can communicate with clients 16 by encapsulating point-to-point signals within network address response headers, and allowing routers 18 to pass the network address response signals to the destination client 16. Using this technique, instead of ignoring the signals coming from clients without recognized data channel addresses, routers 18 simply recognize the signals as network address requests and responses, and relay those signals according to standard configuration relay protocols. In this way, system 10 facilitates communication by clients 16 without using data path 20, and without requiring the clients 16 to have a data channel address recognizable by routers 18. Of course, clients having data channel addresses could implement this technique as well by using control channel addresses instead of their data channel addresses.

In a particular embodiment, instead of encapsulating point-to-point signals directly within configuration headers, client 16 may first encapsulate the point-to-point signal within a tunneling header, and then encapsulate the tunneling header within a network address request header. Likewise, tunneling server 32 may first encapsulate point-to-point signals within a tunneling header, and then encapsulate the tunneling header within a network address response header. Tunneling headers facilitate the use of standard tunneling protocols to maintain tunneling sessions with multiple tunneling clients, providing, for example, flow control and tunnel identification features associated with standard tunneling protocols. The tunneling header could support any tunneling protocol, such as, Layer 2 Tunneling Protocol (L2TP), Point-to-Point Tunneling Protocol (PPTP), Layer 2 Forwarding (L2F), or any other protocol that facilitates establishing a secure connection between two or more network elements.

Tunneling server 32 may comprise any hardware, software, firmware, or any combination thereof operable to manage configuration encapsulated communication with one or more clients 16 over channel 30. Where point-to-point signals are encapsulated directly within configuration headers, tunneling server 32 may include point-to-point termination equipment. Where point-to-point signals are first encapsulated within a tunneling header, and then encapsulated within a configuration header, tunneling server may comprise a virtual private network server, including a tunneling engine operable to maintain multiple tunneling sessions with a plurality of tunneling clients.

In operation, each client 16 desiring communication over control channel 30 first registers with tunneling server 32. This may include, for example, client 16 communicating toward the nearest router 18 a point-to-point signal encapsulated within a configuration protocol request header. In some cases, a client, such as client 16*c* can be coupled directly to tunneling server 32 without a router 18 between the two elements. System 10 also facilitates client 17 tunneling into tunneling server 32, and then using a tunnel established between tunneling server 32 and a destination client 16 to communicate with that client 16.

In any case, the point-to-point signal can be directly encapsulated within the configuration header, or may first be encapsulated within a tunneling header, which is then encapsulated within the configuration header. For ease of description, in either case, the signal encapsulated within the configuration header will be referred to as the "tunneling signal."

Client 16*a* may, for example append a DHCP DISCOVER header to the tunneling signal and communicate the encapsulated signal toward a router 18. Routers 18 along control channel 30 are enabled to relay DHCP DISCOVER messages toward tunneling server 32 (and may also be enabled to relay those messages to any DHCP servers serving enterprise network 12, such as server 26). Tunneling server 32 is configured to examine signals having network address request headers to determine whether those signals contain embedded tunneling signals. Tunneling server 32 may also be configured to relay data channel network address requests to a data channel configuration server, such as DHCP server 26.

Upon identifying a network address request header encapsulating a tunneling signal, tunneling server 32 removes the network address request header from the signal and processes the tunneling signal. If the tunneling signal comprises a tunneling header, tunneling server 32 processes the tunneling header to initiate a tunneling session with client 16. If the tunneling signal comprises only a point-to-point signal (with no tunneling header), tunneling server 32 may terminate the point-to-point signal and process its contents.

In either case, tunneling server 32 assigns the client a control channel address using, for example, standard point-to-point protocols. The control channel address will be used by tunneling server 32 to uniquely identify that client 16 for communications over control channel 30. The control channel address assigned to each tunneling client may, for example, take a similar format to an IP address. Control channel addresses need not be known to routers 18, but rather are used for the purpose of distinguishing one tunneling session from another. Tunneling server 32 may maintain or have access to a list, table, or other data structure cross-referencing control channel addresses with, for example, host names, MAC addresses, IP addresses, and/or other identifiers of client 16.

Tunneling server 32 may communicate a response to tunneling client 16 by generating a tunneling signal including the tunneling client's control channel address, and encapsulating the tunneling signal within a network address response header. For example, tunneling server 32 can encapsulate the response tunneling signal within a DHCP OFFER header, and communicate that message to the tunneling client 16 as a DHCP OFFER message. Again, routers 18 will communicate signals bearing network address response headers whether or not the source and/or destination network elements have data channel addresses referenced in the routing tables of router 18. The tunneling client 16 receives the tunneling signal encapsulated in the DHCP OFFER header, removes the DHCP OFFER header, processes the tunneling header (if present), and accesses the information within the embedded point-to-point signal.

Each time a tunneling client 16 desires to communicate with tunneling server 32, tunneling client 16 encapsulates a tunneling signal within a network address request header. Each time tunneling server 32 wishes to communicate with a registered tunneling client 16, tunneling server 32 encapsulates a tunneling signal within a network address response header. Because routers 18 see these signals as network address requests and responses, routers 18 relay these signals despite the fact that one or more of the tunneling clients and/or tunneling server may not have a data channel address referenced by routing tables within routers 18.

Tunneling server 32 can serve as a relay point for communications between two clients 16 registered with tunneling server 32. For example, client 16a may communicate with client 16n over control channel 30 by first communicating a network address request encapsulated point-to-point signal to tunneling server 32. Client 16a relies on tunneling server 32 to encapsulate the point-to-point signal within a network address response header and communicate that signal to client 16n. Client 16n can then respond to client 16a by encapsulating a point-to-point signal within a network address request header and communicating that signal to tunneling server 32. Tunneling server 32 can access the point-to-point signal, encapsulate the signal within a network address response header, and communicate the network address response encapsulated signal to client 16a.

This technique is useful in a variety of applications. For example, one client 16 (or 17) can manage, troubleshoot, and/or repair elements within another client 16 over control channel 30, even where data channel 20 becomes disabled or otherwise unable to service communication. In particular, a managing client 16 (or 17) can communicate with any other client 16 over control channel 30 so long as both clients have tunneled into tunneling server 32. In that case, a managing client 16 (or 17) can tunnel to any other tunneling client 16 by first tunneling to tunnel server 32, and then having tunnel server 32 communicate signals to the target client 16 through an established tunnel with that client 16. In this manner, a managing client 16 (or 17) could, for example, test network connectivity with a target client 16, reload malfunctioning software onto the target client 16, load a new application, or perform any other maintenance and/or diagnostic function on that client 16.

In another aspect of operation, system 10 facilitates remote operation of functionality available on one client 16n by another client 16a (or 17) over control channel 30. For example, client 16n may include a piece of software, such as an Internet browser. Client 16a (or 17) can remotely operate the browser residing at client 16n by communicating commands to client 16n through tunneling server 32, having those commands applied to the application residing at client 16n, and receiving responses over control channel 30 through tunneling server 32. This feature could apply to any function or process residing on one client 16, which can be accessed by control channel 30.

FIG. 2 is a block diagram showing an exemplary configuration encapsulated tunneling signal 100. Signal 100 includes a destination address (DST) 110 comprising a data link layer address (such as a Media Access Control (MAC) address) of the device intended to receive the communication. Signal 100 further includes a source address (SRC) 112 comprising a data link layer address (such as a MAC address) of the device communicating signal 100. Signal 100 also includes a configuration header 114, which encapsulates a tunneling signal 122. Configuration header 114 may comprise, for example, a network address request header or a network address response header.

Configuration header 114 encapsulates a tunneling signal 122. Tunneling signal 122 includes a Point-to-Point Protocol (PPP) signal 124, which comprises a PPP header 118 appended to a PPP payload 120. In some embodiments, tunneling signal 122 may optionally include a tunneling header 116 encapsulating point-to-point signal 124. Tunneling header 115 can be used in embodiments where tunneling server 32 maintains tunneling sessions between a plurality of tunneling clients to provide flow control and tunnel identification features. Alternatively, tunneling signal 122 could comprise point-to-point signal 124 (without tunneling header 115).

Configuration header 114 may comprise any configuration protocol operable to facilitate communication of a network address request from a client to a configuration server even where the configuration client is not associated with a data channel address; and to facilitate communication of network address responses from the configuration server back to the requesting client. Dynamic Host Configuration Protocol and Bootstrap Protocol are examples of this type of configuration protocol.

Point-to-point signal 124 may carry information in any of a variety of formats. In this example, the information in point-to-point signal 124 is formatted according to the Internet Protocol (IP). Other protocols that could be used include the IPX or APPLETALK™ Protocols. Other communication protocols could be used without departing from the scope of the invention.

Where applicable, tunneling header 115 may support a standard tunneling protocol. For example, tunneling header 116 may support Layer 2 Tunneling Protocol (L2TP), Point-to-Point Tunneling Protocol (PPTP), Layer 2 Forwarding (L2F), or any other protocol that facilitates establishing virtual connections between two or more network elements.

FIG. 3 is a block diagram showing example embodiments of a signal 200 communicated from client 16 toward tunneling server 32, and a signal 300 communicated from tunneling server 32 toward a client 16. Through repeated communication of signals 200 and 300 between a client 16 and tunneling server 32, client 16 can establish and maintain a tunneling session over control channel 30. Multiple clients 16 may each establish tunneling sessions with tunneling server 32 in this manner. In that way, multiple clients 16 coupled to separate subnetworks 14 (or a client 16 coupled to enterprise network 12 and a client 17 coupled to a public network 24) can communicate with each other over control channel 30 through tunneling server 32.

In particular, a client 16a (or 17) can communicate with or access client 16n over control channel 30 by first tunneling to tunneling server 32, and then having tunneling server 32 use a tunnel created by client 16n to complete the communication. Likewise, client 16n could communicate with client 16a by first tunneling into tunneling server 32, then having tunneling server 32 use the tunnel created by client 16a to complete the communication.

In this example, signal 200 comprises a tunneling signal 222 encapsulated within a network address request header 214. Tunneling signal 222 may, but need not include a tunneling header 215, depending on whether tunneling server 32 is configured to maintain tunneling sessions using standard tunneling protocols, thereby enabling features such as flow control tunnel identification often associated with those protocols. In this particular example, network address request header 214 comprises a DHCP DISCOVER header. In a particular embodiment, DHCP DISCOVER header 214 can be broadcast to all configuration servers, including tunneling server 32. In that case, destination address 210 of signal 200 comprises a broadcast address. Depending on the location of the message within system 10, source address 212 comprises the MAC address of the network element communicating the message. On the initial communication, source address 212 comprises the MAC address of client 16a, the client initiating this communication.

Signal 300 comprises a responsive signal from tunneling server 32 directed back toward tunneling client 16a. In this example, signal 300 includes a tunneling signal 322 encapsulated within a network address response header 314. Tunneling signal 322 may, but need not include a tunneling header 315, depending on whether tunneling client 32 is configured to maintain tunneling sessions using standard tunneling protocols, thereby enabling features such as flow control and tunnel identification often associated with those protocols. In this particular example, network address response header 314 comprises a DHCP OFFER header. Source address 312 of signal 300 comprises the MAC address of tunneling server 32, while destination address 310 comprises the MAC address of a router 18 coupled to tunneling client 32. Router 18 will change source address 312 to its own MAC address, and change destination address 310 to the MAC address of client 16a, or the MAC address of another router 18 between the current router and client 16a.

Figure 4:
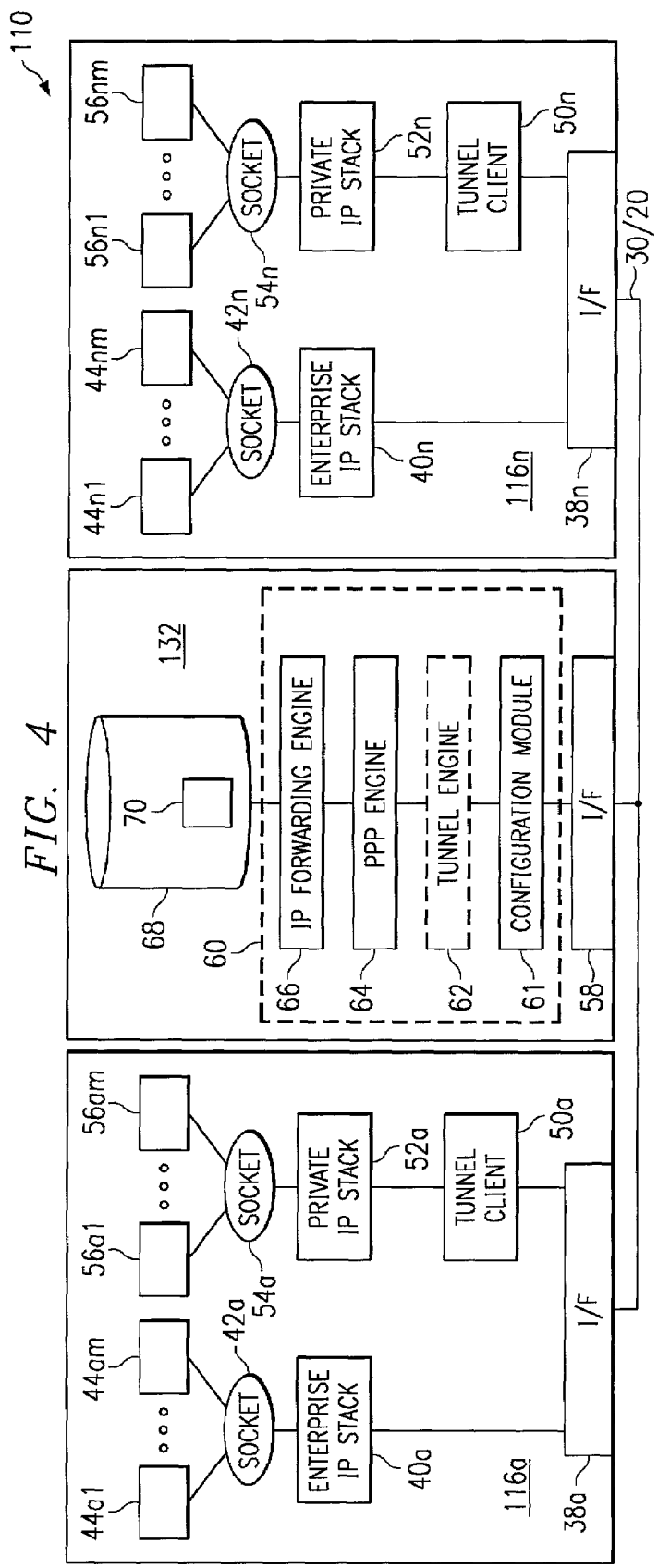
FIG. 4 is a block diagram showing exemplary embodiments of clients coupled to a tunneling server through a control channel according to the teachings of the present invention.

FIG. 4 is a block diagram showing exemplary embodiments of client 16a and 16n coupled to tunneling server 32 through a control channel 30. In this example, each client 16 includes an interface 38. Interface 38 may comprise any hardware, software, and/or firmware operable to provide an interface between a communication link supporting control channel 30 and/or data channel 20 and functional elements within clients 16.

Each client 16 includes an enterprise IP stack 40 communicating with interface 38. Enterprise IP stack 40 comprises a protocol stack implemented in hardware, software, firmware, or any combination thereof operable to receive and process signals received from data channel 20 and associated with data channel addresses recognizable by routers 18. Enterprise IP stack 40 communicates processed signals to socket layer 42, which interfaces with one or more applications 44.

In the illustrated embodiment, each client 116 also includes a tunnel client module 50. Tunnel client module 50 may comprise hardware, software, firmware, or any combination thereof, and operates to send and receive configuration header encapsulated tunneling signals from control channel 30. Tunnel client module 50 performs functions of adding and removing encapsulation headers from signals received. Where tunneling signals include a tunneling header, tunnel client module 50 also adds and removes the tunneling headers from signals received, and processes those headers to maintain a tunneling session with tunnel server 32. Although client tunneling module 50 has been described as a single module providing multiple functions, one or more of those functions could reside within a separate module from client tunneling module 50.

Tunnel client module 50 is coupled to a private IP stack 52. Private IP stack 52 is similar in structure and function to enterprise IP stack 40. However, private IP stack 52 receives and processes signals from control channel 30—signals having a control channel address, rather than a data channel address recognized by routers 18. If desired, private IP stack 52 could be made invisible to the client's operating system.

Private IP stack 52 is coupled to a socket layer 54, which provides an interface between private IP protocol stack 52 and one or more applications 56. Applications 56 could, for example, include a maintenance application operable to receive information or an input command to diagnose, trouble shoot, and/or repair malfunctioning elements within or network connections to client 116. In a particular embodiment, control channel 30 and maintenance application 56 could provide a "back door" entrance to client 116, facilitating trouble shooting and/or repair where client 116 is inaccessible through data channel 20.

Turning to tunneling server 132, tunneling server 132 includes an interface 58, which may be similar in structure and function to interfaces 38 in clients 116. Interface 58 couples to a tunnel server module 60. Tunnel server module 60 may comprise hardware, software, firmware, or any combination thereof. In this example, tunnel server module 60 operates to identify network address request encapsulated tunneling signals, and to strip the network address request header from the signal to reveal the tunneling signal within. Tunneling server module 60 examines the tunneling signal to determine an appropriate response, adjusts the contents of the tunneling signal as necessary, and appends a network address response header to the tunneling signal. Tunneling server module 60 then communicates the network address response encapsulated tunneling signal to a registered tunneling client 116.

Tunneling server module 60 comprises a configuration module 61, which operates to identify network address request headers, strip those headers from tunneling signals, and reencapsulate the tunneling signals within network address response headers. Depending on the specific features enabled in tunnel server 132, tunneling server module 60 may also include a tunneling engine 62. Tunneling engine 62 receives tunneling signals having tunneling headers, removes and processes the tunneling header, and initiates and/or maintains a tunneling session between tunneling server 132 and the client 116 communicating with tunneling server 132.

Tunneling server module 60 further includes a point-to-point protocol engine 64 operable to process and/or terminate point-to-point signals after the configuration header and tunneling header (if present) are removed. Tunneling server module 60 could also include an IP forwarding engine 66 operable to perform any necessary address resolutions to identify a control channel address of an intended recipient client 116. IP forwarding engine 66 may consult, for example, a data structure 70 stored in a memory 68 to resolve a control channel address based on other identifying information provided.

Memory 68 may comprise any storage medium or media and may include any of a variety of data structures, arrangements, and/or compilations operable to store and facilitate retrieval of various information stored within memory 68. Although memory 68 is shown as residing locally within tunneling server 132, all or a portion of memory 68 could alternatively reside at a remote location accessible to tunneling server 132. For example, all or a portion of data structure 70 could reside at a network element remote from and accessible to tunneling server 132. In addition, although configuration module 60, tunnel engine 62, PPP engine 64, and IP forwarding engine 66 are shown as separate functional elements, the functionality of one or more of these elements could be combined into fewer elements without the departing from the scope of the invention. Moreover, depending on the particular features desired, one or more of those functional modules could be eliminated entirely.

In operation, each client 116a and 116n at some point initiates communication with tunneling server 132 to obtain a control channel address. Clients 116a and 116n communicate with tunneling server 132 by encapsulating tunneling signals within network address request headers, such as DHCP DISCOVER headers or Boot-P REQUEST headers. Tunneling server 132 examines signals received from clients 116 and identifies network address request headers. Tunnel server 132 establishes a tunneling session with each client 116 and awards each client 116 a control channel address distinguishing that client from other clients 116 using control channel 30. Tunneling server 132 may store the control channel address assigned to each client 16 in a table, list, or other data structure 70 within memory 68.

Tunneling server 132 communicates information back to clients 116 by generating a tunneling signal encapsulated within a network address response header, such as a DHCP OFFER header or a Boot-P RESPONSE header. Those signals are then communicated back to clients 116 as network address responses. The signals may include, for example, an identification of the client's control channel address, as well as tunneling session information (where applicable) establishing and/or maintaining a tunneling session according to a standard tunneling protocol, such as L2TP, PPTP, or L2F.

Figure 5:
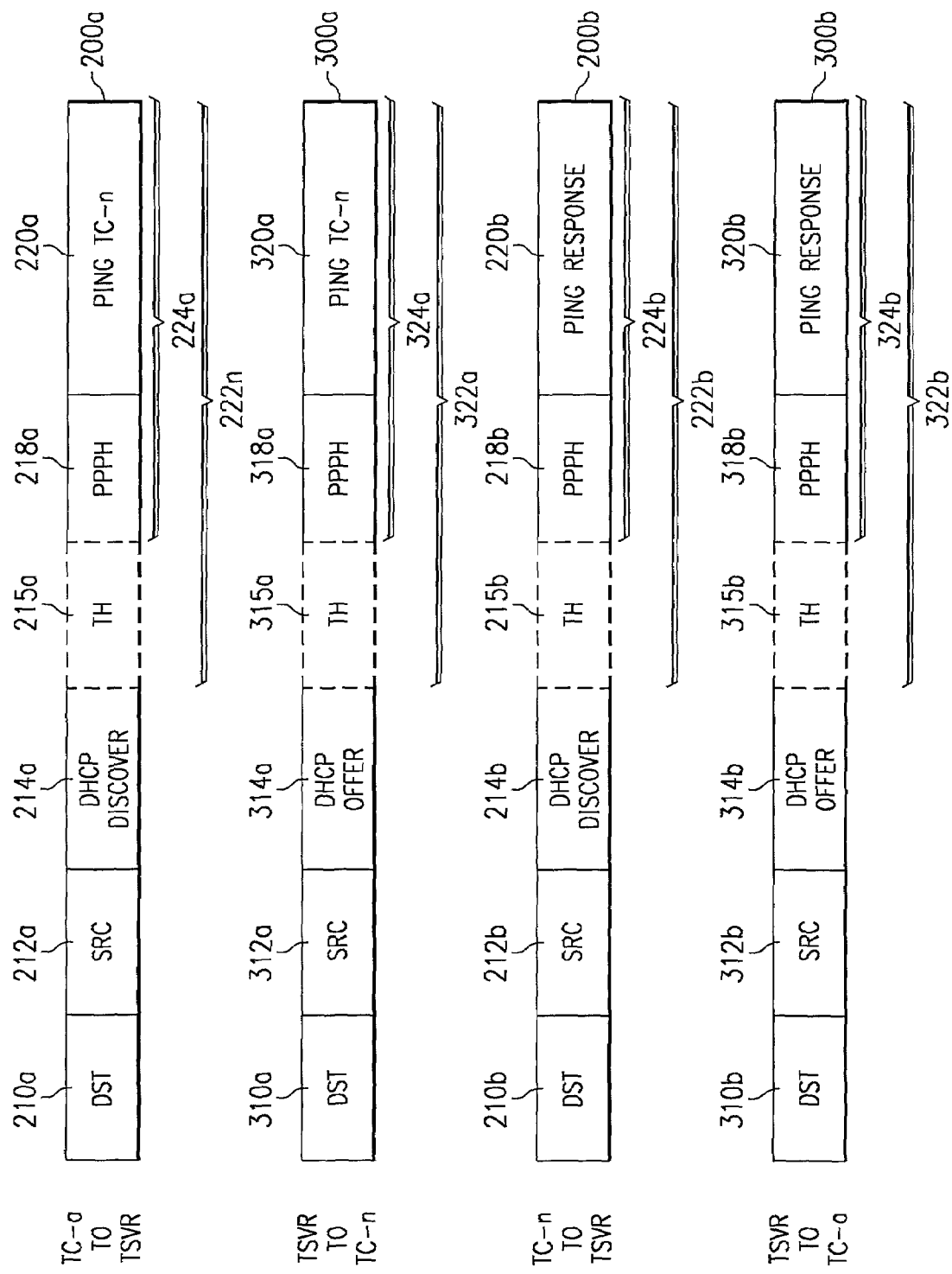
FIGS. 5 and 6 are block diagrams showing a plurality of configuration encapsulated tunneling signals operable for use in communication between two clients and a tunneling server over a control channel according to the teachings of the present invention.
Figure 6:
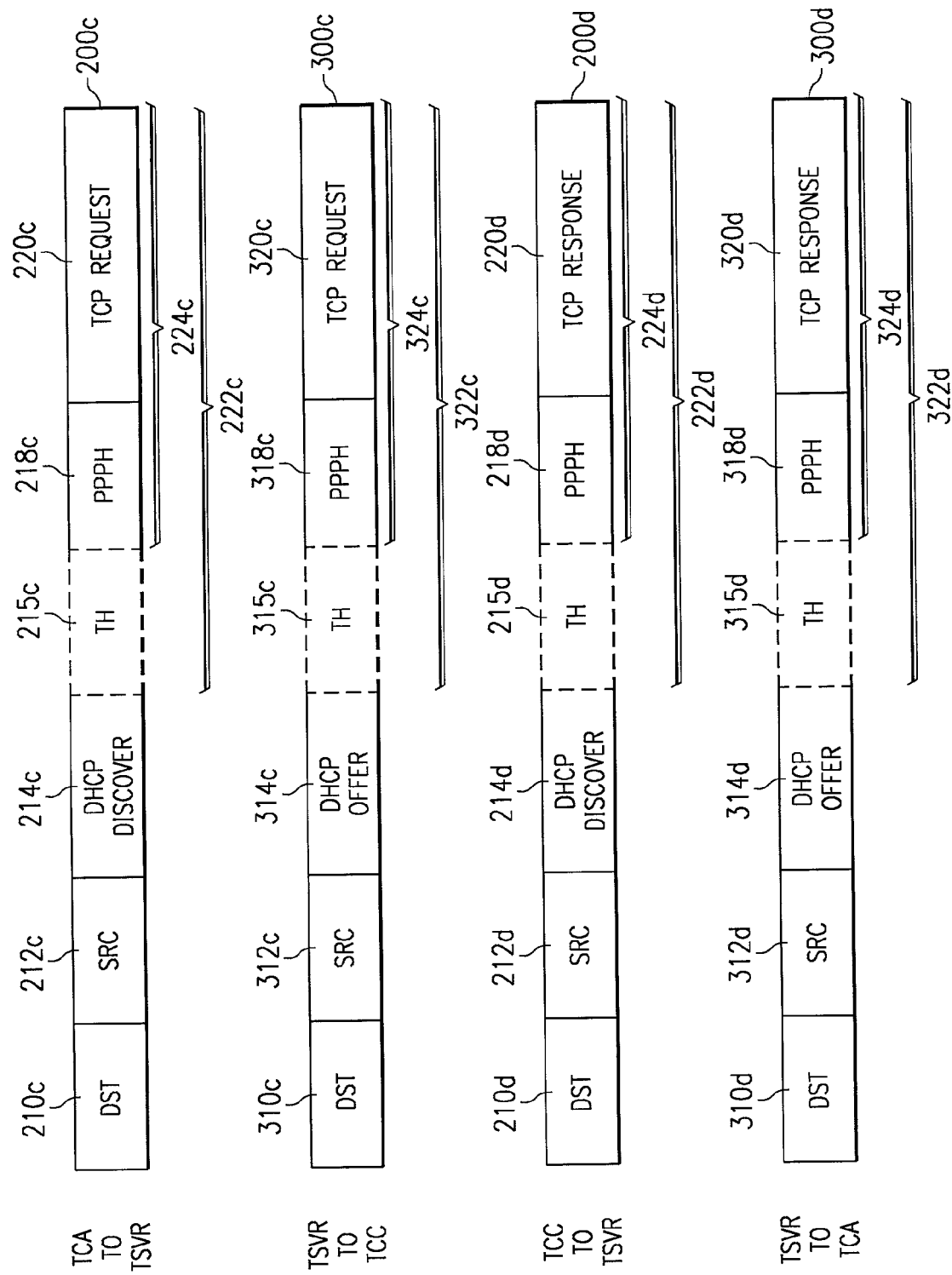

Once clients 116a and 116n have established a session with tunneling server 132, those clients may communicate over control channel 30 with one another, or with any other client registered with tunneling server 132. FIGS. 5 and 6 provide examples of signals communicated during communication sessions between two clients 116a and 116n that are registered with tunneling server 132.

FIG. 5 is a block diagram showing a plurality of configuration encapsulated tunneling signals used in communication between two tunneling clients 116a and 116n over control channel 30. This example assumes that client 116a and client 116n have each established a tunneling session with tunnel server 132 over control channel 30. The example shown in FIG. 5 also assumes that client 116a desires to perform a diagnostic function on client 116n using control channel 30. As a particular example, FIG. 5 shows a situation where client 116a desires to PING client 116n to test the network connectivity associated with client 116n.

In this example, client 116a communicates signal 200a toward tunnel server 132. PPP signal 224a of signal 200 includes a Packet Internet Groper (PING) signal intended for client 116n. This example assumes that client 116a knows the control channel address of client 116n and includes that control channel address within PPP portion 224a of signal 200a. Client 116a may initially obtain the control channel address of client 116n, for example, by communicating a request to tunnel server 132 or a domain name server accessible to client 116a identifying host name, IP address, MAC address, or other identifier of client 116n and requesting the control channel address for client 16n. Tunneling server 132 or a domain name server could determine the desired control channel address, for example, by using the identifier supplied by client 116a to access data structure 70 in memory 68 and identify the desired control channel address.

In another embodiment, instead of including the control channel address within the point-to-point signal, client 116a could include a host name, IP address, MAC address, or other identifier within the point-to-point header of the tunneling signal, and rely on tunneling server 132 to identify the desired control channel address from the information provided. For example, tunneling sever 32 may receive only an indication of the destination client's host name or MAC address, and may use that information to index a data structure 70 and cross reference a control channel address associated with the destination client.

This example (and the example described in FIG. 6) assumes that tunneling signal 222a includes a tunneling header 215a that will be used to maintain a tunneling session with tunneling server 132 according to a standard tunneling protocol, such as L2TP, PPTP, or L2F. It should be recognized that signals 200 and 300 could exclude tunneling headers 215 and 315 consistent with the present invention.

Tunneling signal 222a of signal 200 is encapsulated in a network address request header, in this case a DHCP DISCOVER header 214a. The configuration encapsulated tunneling signal 200 is communicated toward configuration servers serving enterprise network 12, and relayed by routers 18 to those servers. Tunneling server 132 monitors traffic and identifies signals encapsulated within network address requests. Tunneling server 132 examines those signals to determine whether tunneling signals 222 are encapsulated therein. Tunneling server 132 may also forward data channel network address requests toward DHCP server 26.

After identifying DHCP DISCOVER header 214a on signal 200a, tunneling server 132 strips and processes the DHCP DISCOVER header 214a and the tunneling header 215a (if present) from tunneling signal 222a. Tunneling server 132 next examines PPP signal 224a to identify a control channel address associated with client 116n for which the payload is intended. In this case, PPP signal 224a contains the control channel address of client 116a. In other embodiments where the control channel address was unknown to client 116a, tunneling server 132 could, for example, invoke IP forwarding engine 66 to cross reference data structure 70 with an identifier, such as the host name of client 116n, to determine that client's control channel address.

Tunnel server 132 then generates PPP signal 324a, which includes the control channel address of client 116n. Tunnel server 32 appends tunneling header 315a (if used) and network address response header 314a to PPP signal 324a. In this example, network address response header 314a comprises a DHCP OFFER header. Tunneling server 132 appends destination address 310a and source address 312a to the network address response header and communicates signal 300a over control channel 30 toward client 116n.

Signal 300a shows a network address response encapsulated signal communicated from tunnel server 132 to client 116n. Signal 300a includes tunneling signal 322a encapsulated within a DHCP OFFER header 314a. Tunneling signal 322a comprises a tunneling header 315a appended to a point-to-point encapsulated signal 324a. Point-to-point encapsulated signal 324a carries the PING signal to client 116n.

Client 116n receives signal 300a and removes configuration header 314a to reveal tunneling signal 322a. Client 16n then removes tunneling header 315a (if present) and point-to-point header 318a, and accesses the PING signal in payload 320a. Client 116n processes the PING signal and formulates a response to the PING signal. The PING response is then formatted into a PPP signal 324b, which includes the control channel address identifying client 116a as the recipient of the PING response.

Client 116n may encapsulate PPP signal 224b in a tunneling header 215b, and encapsulates tunneling signal 222b within a DHCP DISCOVER header 214b. Client 116n then communicates tunneling signal 200b toward tunneling server 132 for ultimate delivery to client 116a. Routers 18 relay network address request encapsulated signal 200b toward tunneling server 132.

Tunneling server 132 receives and examines signal 200b, identifies DHCP DISCOVER header 214b, and strips that header to reveal tunneling signal 222b. Tunneling server 132 processes tunneling header 215b (if present) and point-to-point header 218b to identify the intended recipient of PPP payload 220b. Tunnel server 132 uses this information to build signal 300b to facilitate transmission of the PING response back to client 116a.

Tunneling server 132 builds signal 300b by encapsulating the PING response 320b addressed to the control channel address of client 16a within a tunneling header 315b (if used) and a DHCP OFFER header 314b. Tunneling server 132 communicates network address response encapsulated signal 300b toward client 16a, which may include having the signal relayed by one or more routers 18. Client 116a receives signal 300b and strips and processes DHCP OFFER header 314b, tunneling header 315b (if used), and point-to-point header 318b. Client 116a then extracts PING response signal from payload 320b and processes that signal.

Although the foregoing example described communication of a PING signal from client 116a to client 116n, and receipt of a response to the PING signal by client 116a from client 116n, this procedure could be used to facilitate any type of communication between two or more clients over a control channel 30. For example, client 116n may lose network connectivity over data channel 20 and be inaccessible by other clients 116 for diagnostics over data channel 20. Client 116a, or any other client 116 can register with tunneling server 132 and use control channel 30 as an alternative method of communicating with client 116n. In this manner, client 116a could be used, for example, to access client 116n, execute various diagnostics programs, load additional functionality, or replace or repair existing functionality at client 116n.

FIG. 6 is a block diagram showing further examples of signals 200 and 300 communicated between tunneling clients 116 and tunneling server 132. This example assumes that client 116a desires to remotely operate a feature residing at client 116n using control channel 30. In this particular example, client 116a desires to use a browser program residing at client 116n. Client 116a first forms network address request encapsulated signal 200c. Signal 200c includes PPP signal 224c having a TCP request associated with the control channel address of client 116n (or including an identifier to facilitate tunneling server 132 identifying the control channel address). TCP request 220c in signal 200c represents a command to be executed on a browser operating at client 116n.

Client 116a communicates message 200c as a DHCP DISCOVER message. Where one or more routers 18 receive message 200c, those routers 18 relay signal 200c toward tunneling server 132 without referencing a routing table indexed by data channel addresses or requiring a data channel address of client 116a. Tunneling server 132 receives signal 200c, and strips and processes DHCP DISCOVER header 214c and tunneling header 215c (if present). Tunneling server 132 then examines point-to-point signal 224c and identifies the control channel address of client 116n for which this signal is intended. Tunneling server 132 then generates signal 300c for transmission to client 116n.

Signal 300c includes tunneling signal 322c having the TCP request encapsulated within point-to-point header 318c. In a particular embodiment, tunneling signal 322c also includes tunneling header 315c. Tunneling server 132 encapsulates tunneling signal 322c within a DHCP OFFER header 314c and communicates signal 300c toward client 116n. Routers between tunneling server 132 and client 116n communicate signal 300c to client 116n based on configuration protocol forwarding rules and without referencing a routing table indexed by data channel addresses.

Client 116n receives signal 300c, and strips and processes DHCP OFFER header 314c, tunneling header 315c (if present), and point-to-point header 318c. Client 116n then applies TCP request 320c to its browser application, receives the TCP response, and encapsulates all or a portion of the TCP response within a point-to-point header 218d (and in some cases a tunneling header 215d) to form tunneling signal 222d. Client 116n then encapsulates tunneling signal 222d within a DHCP DISCOVER header 214d and communicates signal 200d toward tunneling server 32. Where the TCP response is larger than the payload capacity of signal 200d, client 116n may communicate the response in a plurality of signals 200d.

Routers 18 between client 116n and tunneling server 132 relay signal 200d toward tunneling server 132. Tunneling server 32 examines signal 200d and identifies DHCP DIS- COVER header 214*d*. Tunneling server 32 strips and processes DHCP DISCOVER header 214*d* and tunneling header 215*d* (if present). Tunneling server 132 then examines the PPP signal to identify the control channel address of client 116*a*. Tunnel server 132 then generates signal 300*d* including the TCP response from payload 220*d* encapsulated as payload 320*d* to point-to-point header 318*d*. Tunneling server 32 appends DHCP OFFER header 314*d* (and optionally tunneling header 315*d*), and communicates signal 300*d* to client 16*a* using forwarding procedures associated with the applicable configuration protocol and without referencing a routing table within router 18 indexed by data channel addresses.

Client 116*a* receives signal 300*d*, strips the header information from payload 320*d*, and analyzes the TCP response. This sequence of signaling provides one example of remotely operating a feature existing on one client through another client coupled to the same enterprise network using a control channel 30 and a tunneling server 32. This method could be applied to any feature that is desired to be controlled in such a manner.

FIG. 7 is a flow chart showing one example of a method 400 of communicating information over a control channel 30. The method 400 begins at step 410 where client 16*a* generates a tunneling signal 222. This may include, for example, inserting information destined for another client 16*n* into a payload 220 of a point-to-point signal 224, and identifying client 16*n* as the recipient of the information in point-to-point header 218. In addition, in some embodiments, this may include appending a tunneling header 215 to point-to-point signal 224 to facilitate provision of features such as flow control and tunnel identification features typically associated with standard tunneling protocols.

Although this example assumes that a client 16 within enterprise network 12 desires to communicate over control channel 30, this method is also applicable to a client 17 coupled to public network 24. For example, assuming firewall 22 is configured to facilitate a standard tunneling protocol, client 17 could tunnel into tunneling server 32 using a standard tunneling protocol over data channel 20, and then communicate with another tunneled client 16 using control channel 30. For ease of description, the remainder of this example assumes both clients 16*a* and 16*n* reside within enterprise network 12.

The information inserted into payload 220 of tunneling signal 222 may comprise, for example, data for use in a maintenance application residing at client 16*n*, which can use that data to perform, for example, diagnostics, troubleshooting, and/or maintenance on various aspects of client 16*n*. Alternatively, this information could include all or a portion of an application to be loaded onto client 16*n*. As still another example, this information could include a command to be executed by an application residing on client 16*n*.

Client 16*a* encapsulates tunneling signal 222 within a network address request header 214. Network address request header 214 may comprise, for example, a DHCP DISCOVER header or a Bootstrap Protocol REQUEST header. Client 16*a* communicates the network address request encapsulated tunneling signal 200 toward tunneling server 32 at step 430. This may include, for example, communicating signal 200 toward a router 18 enabled to relay network address requests toward configuration servers, including tunneling server 32. Router 18 can forward signal 200 to tunneling server 32 without referencing a routing table indexed by data channel addresses or requiring a data channel address from client 16*a*.

Client 16*a* receives a network address response encapsulated tunneling signal 300 at step 440. This may include, for example, client 16*a* receiving signal 300 from router 18*a*, router 18 forwarding signal 300 from tunneling server 32 without referencing a routing table indexed by data channel addresses or requiring a data channel address associated with client 16*a*.

FIG. 8 is a flowchart showing one example of a method 500 of managing communication between clients on an enterprise network. The method 500 begins at step 510, where tunneling server 32 receives a network address request encapsulated tunneling signal 200 including information originating at a client 16. This may include, for example, tunnel server 32 receiving a tunneling signal encapsulated within a DHCP DISCOVER header 214. In some cases, the signal 200 is forwarded by router 18*a* without referencing a routing table indexed by data channel addresses, and without requiring a data channel address of the client.

Tunneling server 32 removes network address request header 214 at step 520 and processes the header or headers of tunneling signal 222 at step 530. In a particular embodiment, signal 200 may include tunneling header 215. Tunneling server 32 may remove and process tunneling header 215 to maintain a tunneling session between source client 16*a* and tunneling server 32. Through this tunneling session, tunneling server 32 can, for example, maintain multiple tunneling sessions with multiple clients 16 and provide flow control between those tunneling sessions.

Tunneling server 32 identifies the destination client 16 associated with signal 200 at step 540. This may include, for example, accessing point-to-point signal 224 to determine a control channel address associated with the destination client 16. Alternatively, point-to-point signal 224 may comprise another identifier associated with destination client 16, such as the host name, MAC address, IP address, or other identifier associated with client 16. Tunneling server 32 may use this identifier as an index to a data structure containing cross-reference information between control channel addresses and these types of identifiers. Data structure 70 may reside, for example, locally to tunneling server 32 or may reside at another location, such as a domain name server serving enterprise network 12.

Tunneling server 32 prepares tunneling signal 322 for transmission at step 550. Where point-to-point signal 224 included the control channel address of destination client 16, this step may comprise formatting a point-to-point protocol signal 324 comprising the point-to-point payload received from signal 200 and including the control channel address of the destination client. In a particular embodiment, this step may also include encapsulating point-to-point signal 324 within a tunneling header 315. Tunneling header 315 contains information facilitating maintenance of a tunneling session between tunneling server 32 and destination client 16. Tunneling header 315 may comprise, for example, an L2TP header, a PPTP header, an L2F header, or other tunneling protocol header.

Tunneling server 32 encapsulates tunneling signal 322 within network address response header 314 at step 560. network address response header 314 may comprise, for cull example, a DHCP OFFER header or a Bootstrap protocol response header.

Tunneling server 32 communicates the network address response encapsulated tunneling signal 300 toward the destination client 16 at step 570. This may include, for example, communicating signal 300 toward a router 18 for forwarding toward the destination client 16. Router 18 can forward signal 300 to the destination client without referencing a routing table indexed by data channel addresses and without requiring a data channel address associated with the destination client 16.

FIG. 9 is a flow chart showing one example of a method 600 of communicating information in an enterprise network. The method 600 begins at step 610 where client 16n receives a network address response encapsulated tunneling signal 300. Signal 300 may have been forwarded, for example, from tunneling server 32 through a router 18. Client 16n removes the network address response header 314 from signal 300 at step 620.

Client 16n processes the header or headers of tunneling signal 322 within signal 300 at step 630. This may include, for example, removing and processing a tunneling header 315 to facilitate maintenance of a tunneling session between client 16n and tunneling server 32.

Client 16n processes payload 320 of tunneling signal 300 at step 640. Depending on the contents of payload 320, this step may include, for example, communicating information to an application running on client 16n, loading a new application or a portion thereof to client 16n, diagnosing sources of operational difficulties at client 16n, loading replacement code for malfunctioning applications residing at client 16n, or any other information that may be useful to client 16n.

In some embodiments, client 16n may generate data based on processing payload 320 at step 650 and form a tunneling signal 200 including the generated data at step 660. This may include, for example, applying a command to an application 56 residing at client 16n, deriving a response to that command, and including at least a portion of the response as payload 220 to tunneling signal 222. In those cases, client 16n may encapsulate tunneling signal 222 within a network address request header 214 at step 670. Client 16n may then communicate the network address request encapsulated tunneling signal 200 toward tunneling server 32 at step 680. This may include, for example, communicating signal 300 toward a router 18 for forwarding to tunneling server 32. Tunneling server 32 can, in turn, as discussed with respect to FIG. 8, forward the payload onto the client 16 (or 17) that originally initiated the communication with client 16n. Where the response from application 56 comprises more information than the capacity of payload 220, client 16n may formulate multiple tunneling signals 222 for transmission to client 16a, each signal comprising a portion of the response.

Although the present invention has been described in several embodiments, a myriad of changes, variations, alterations, transformations, and modifications may be suggested to one skilled in the art, and it is intended that the present invention encompass such changes, variations, alterations, transformations, and modifications as fall within the spirit and scope of the appended claims.

What is claimed is:

1. A method of communicating information, comprising:
at a first client, forming a first message by encapsulating a point-to-point data unit within a network address request header, wherein the point-to-point data unit comprises a header including an identifier associated with a second client and a payload comprising information to be communicated to the second client, and wherein the first client comprises a client protocol stack to generate the point-to-point data unit;
at a tunneling server, receiving the first message, removing the network address request header, and encapsulating the point-to-point data unit within a network address response header to form a second message, wherein the tunneling server comprises a server protocol stack to process at least a portion of the first message; and
communicating the second message toward the second client.

2. The method of claim 1, wherein the network address request header comprises a Dynamic Host Configuration Protocol DISCOVER header or a Bootstrap Protocol REQUEST header.

3. The method of claim 1, wherein the network address response header comprises a Dynamic Host Configuration Protocol OFFER header or a Bootstrap Protocol RESPONSE header.

4. The method of claim 1, wherein the point-to-point data unit is encapsulated within a tunneling header prior to being encapsulated into the network address-request header, the tunneling header operable to facilitate maintenance of a tunneling session between the tunneling server and the first client.

5. The method of claim 4, wherein the tunneling header comprises a tunneling header selected from the group consisting of a Layer Two Tunneling Protocol (L2TP) header, a Point to Point Tunneling Protocol (PPTP), or a Layer Two Forwarding (L2F) header.

6. A method of communicating in an enterprise network, comprising:
at a tunneling server, receiving from a first client a first message, the first message formed by encapsulating a point-to-point data unit within a network address request header, the point-to-point data unit comprising a first header that includes an identifier associated with a second client, and a payload comprising information to be communicated to the second client, wherein the tunneling server comprises a protocol stack to process at least a portion of the first message;
encapsulating the first message within a network address response header to form a second message; and
communicating the second message toward the second client.

7. The method of claim 6, wherein the network address request header comprises a Dynamic Host Configuration Protocol DISCOVER header or a Bootstrap Protocol REQUEST header.

8. The method of claim 6, wherein the network address response header comprises a Dynamic Host Configuration Protocol OFFER header or a Bootstrap Protocol RESPONSE header.

9. The method of claim 6, wherein the point-to-point data unit is encapsulated within a tunneling header, the tunneling header operable to facilitate maintenance of a tunneling session between the tunneling server and the first client.

10. The method of claim 9, wherein the tunneling header comprises a tunneling header selected from the group consisting of a Layer Two Tunneling Protocol (L2TP) header, a Point to Point Tunneling Protocol (PPTP), or a Layer Two Forwarding (L2F) header.

11. The method of claim 6, wherein the point-to-point data unit is encapsulated within a tunneling header, the tunneling header operable to facilitate maintenance of a tunneling session between the tunneling server and the second client.

12. The method of claim 6, wherein communicating the second message toward the second client comprises communicating the second message toward a router operable to relay the second message toward the second client without referencing a routing table indexed by data channel addresses.

13. The method of claim 12, wherein the identifier comprises a control channel address identifying the second client, the control channel address being different than any data channel address recognized by the router.

14. The method of claim 6, wherein the identifier comprises an identifier of the second client other than a control channel address, and further comprising accessing a memory to determine, based on the identifier, a control channel address of the second client.

15. The method of claim 6, wherein the point-to-point data unit comprises information to be applied to an application residing at the second client.

16. The method of claim 15, wherein the application residing at the second client comprises a maintenance application operable to diagnose operational characteristics of the second client.

17. The method of claim 6, wherein the point-to-point data unit comprises at least a portion of an application to be installed on the second client.

18. The method of claim 6, further comprising removing the network address request header before encapsulating the first message within the network address response header.

19. A computer readable medium operable to execute the following steps on a processor of a computer:
at a tunneling server, receiving from a first client a first message formed by encapsulating a point-to-point data unit within a network address request header, the point-to-point data unit comprising a first header that includes an identifier associated with a second client, and a payload comprising information to be communicated to the second client, wherein the tunneling server comprises a protocol stack to process at least a portion of the point-to-point data unit;
removing the point-to-point data unit from the first message;
encapsulating the point-to-point data unit within a network address response header to form a second message; and
communicating the second message toward the second client.

20. The computer readable medium of claim 19, wherein the point-to-point data unit is encapsulated within a tunneling header, the tunneling header operable to facilitate maintenance of a tunneling session between the tunneling server and the first client.

21. The computer readable medium of claim 19, wherein the point-to-point data unit is encapsulated within a tunneling header, the tunneling header operable to facilitate maintenance of a tunneling session between the tunneling server and the second client.

22. The computer readable medium of claim 19, wherein communicating the second message toward the second client comprises communicating the toward a router operable to relay the second message to the second client without referencing a routing table indexed by data channel addresses.

23. The computer readable medium of claim 22, wherein the point-to-point data unit comprises a control channel address identifying the second client, the control channel address being different than any data channel address recognized by the router.

24. The computer readable medium of claim 19, wherein the first identifier comprises an identifier other than a control channel address of the second client, and further comprising accessing a memory to determine, based on the identifier, a control channel address of the second client.

25. The computer readable medium of claim 19, wherein the point-to-point data unit comprises information to be applied to an application residing at the destination client.

26. The computer readable medium of claim 19, wherein the point-to-point data unit comprises at least a portion of an application to be installed on the second client.

27. In an enterprise network comprising at least one client coupled to a tunneling server, a tunneling server comprising:
a tunneling module operable to receive a first message formed by encapsulating a point-to-point data unit within a network address request header; and
a protocol stack operable to process at least a portion of the point-to-point data unit to identify a control channel address associated with a destination client;
wherein the tunneling module is further operable to encapsulate the point-to-point data unit within a network address response header to form a second message and wherein the tunneling server is operable to communicate the second message toward the destination client.

28. The tunneling server of claim 27, wherein the network address request header comprises a Dynamic Host Configuration Protocol DISCOVER header or a Bootstrap Protocol REQUEST header.

29. The tunneling server of claim 27, wherein the network address response header comprises a Dynamic Host Configuration Protocol OFFER header or a Bootstrap Protocol response header.

30. The tunneling server of claim 27, wherein the point-to-point data unit comprises a control channel address identifying the destination client, and wherein the tunneling server is further operable to communicate the first message toward a router for forwarding to the destination client without reference to a routing table indexed by data channel addresses.

31. The tunneling server of claim 27, wherein the point-to-point data unit is encapsulated within a tunneling header and further encapsulated within the network address request header, and wherein the tunneling module is operable to process the tunneling header to maintain a tunneling session between the tunneling server and a client originating the first message.

32. The tunneling saver of claim 31, wherein the tunneling header comprises a tunneling header selected from the group consisting of a Layer Two Tunneling Protocol (L2TP) header, a Point to Point Tunneling Protocol (PPTP), or a Layer Two Forwarding (L2F) header.

33. The tunneling server of claim 27, wherein the tunneling module is operable to encapsulate the point-to-point data unit within a tunneling header before encapsulating the point-to-point data unit within the network address response header, the tunneling header operable to facilitate maintenance of a tunneling session between the tunneling server and the destination client.

34. The tunneling server of claim 27, wherein the point-to-point data unit comprises a payload comprising information to be applied to an application residing at the destination client.

35. The tunneling server of claim 34, wherein the payload comprises information to be applied to a maintenance application residing at the destination client and operable to diagnose operational characteristics of the destination client.

36. A system operable to facilitate communication with a destination client in an enterprise network, the system comprising:

a first client comprising;
  a client protocol stack operable to generate a point-to-point data unit; and
  a tunneling module operable to encapsulate the point-to-point data unit within a network address request header to form a first message;
  wherein the first client is operable to communicate the first message toward a tunneling server; and
a tunneling server comprising:
  a tunneling module operable to receive the first message; and
  a server protocol stack operable to process at least a portion of the point-to-point data unit to identify a control channel address associated with a destination client;
  wherein the tunneling module is further operable to encapsulate the point-to-point data unit within a network address response header to form a second message and wherein the tunneling server is operable to communicate the second message toward the destination client.

* * * * *